(12) United States Patent
Chapman et al.

(10) Patent No.: US 7,302,887 B1
(45) Date of Patent: Dec. 4, 2007

(54) KITCHEN HAND TOOL

(75) Inventors: Dean Chapman, Montclair, NJ (US);
Paul Goetz, New York, NY (US);
Matthew Chin, New York, NY (US);
Ed Kilduff, New York, NY (US);
Gareth Brown, Jersey City, NJ (US)

(73) Assignee: Freshlink Product Development LLC, New York, NY (US)

( * ) Notice: Subject to any disclaimer, the term of this patent is extended or adjusted under 35 U.S.C. 154(b) by 0 days.

(21) Appl. No.: 11/672,037

(22) Filed: Feb. 6, 2007

Related U.S. Application Data

(60) Provisional application No. 60/771,067, filed on Feb. 7, 2006.

(51) Int. Cl.
*B30B 7/00* (2006.01)
*A47J 19/04* (2006.01)
*B30B 9/06* (2006.01)

(52) U.S. Cl. .............. 100/234; 100/116; 100/126; 100/288; 100/292; 99/495; 241/169; 241/169.2

(58) Field of Classification Search ............. 100/110, 100/116, 125, 234, 243, 288, 292, 126; 241/167, 241/169.1, 169.2, 169; 99/495, 506–510, 99/511; D7/665, 666
See application file for complete search history.

(56) References Cited

U.S. PATENT DOCUMENTS

| | | | | |
|---|---|---|---|---|
| 2,413,178 | A * | 12/1946 | Feltman | 100/234 |
| 2,526,273 | A * | 10/1950 | Rimes | 30/120.5 |
| 6,382,090 | B1 * | 5/2002 | Kokkinos et al. | 99/510 |
| 2007/0119314 | A1 * | 5/2007 | Acker | 100/126 |

* cited by examiner

*Primary Examiner*—Jimmy T. Nguyen
(74) *Attorney, Agent, or Firm*—White-Welker & Welker, LLC

(57) ABSTRACT

A kitchen hand tool for crushing, slicing, or juicing food products. The tool is operated by closing two handles that rotate a drive gear that engages the ratcheting tooth portion of a crush paddle resulting in the movement of the crush paddle toward a basket, crushing and discharge of the food item through the basket. A drive pawl forces the drive gear to rotate counterclockwise, which in turn forces ratcheting tooth portion and subsequently the crushing paddle down in a clockwise direction applying crushing force on the garlic or any item placed in the crushing area. As the drive gear turns until it clicks past a locking pawl. This cycle of opening and closing the handles is repeated until the crush paddle is fully advanced and can move no further and is against the basket.

11 Claims, 6 Drawing Sheets

KITCHEN HAND TOOL

CROSS REFERENCE TO RELATED APPLICATIONS

This application claims priority from U.S. Provisional Patent Application Ser. No. 60/771,067, entitled "Kitchen Hand Tool", filed on Feb. 7, 2006.

TECHNICAL FIELD OF THE INVENTION

The present invention relates generally to a kitchen hand tool. More specifically, the present invention relates to a kitchen hand tool specifically designed for crushing, pressing and extruding food items such as garlic.

BACKGROUND OF THE INVENTION

Kitchen hand tools and presses are widely used in homes across the globe. Users are constantly looking for better, easier, and more efficient devices to use in food preparation. Fore example, it is well known that opening soup cans or uncorking wine can be a challenge for those with diminished hand strength. In response to this need devices designed to reduce the force needed to twist a can opener, open a lid, or uncork a bottle of wine have been developed.

The present invention relates to the manual slicing, juicing, or crushing of food items. While many devices are known in the prior art, they all suffer from similar or related shortcomings. For example, many have exposed gears or ratchet teeth than can cause injury to a user. Many are difficult to use and provide little leverage to a user wishing to crush or juice a food item. Still others require the use of screws or rivets that result in devices that continually break, need repair, or constant adjustment or tightening.

Therefore, it is an objective of the present invention to teach a kitchen hand tool that eliminates or reduces the risk of a user being caught in the ratchet teeth while also providing a tool that eliminates the need for a cover panel and screws.

It is another objective of the present invention to teach a kitchen hand tool that has interchangeable plates which enables various pressing uses such as chopping, slicing, crushing, juicing, etc.

It is yet another objective of the present invention to teach a kitchen hand tool that requires less force by a user.

SUMMARY OF THE INVENTION

The present invention is a kitchen hand tool for crushing, slicing, or juicing food products. The tool is operated by closing two handles that rotate a drive gear that engages the ratcheting tooth portion of a crush paddle resulting in the movement of the crush paddle toward a basket, crushing and discharge of the food item through the basket. A drive pawl forces the drive gear to rotate counterclockwise, which in turn forces ratcheting tooth portion and subsequently the crushing paddle down in a clockwise direction applying crushing force on the garlic or any item placed in the crushing area. As the drive gear turns until it clicks past a locking pawl. This cycle of opening and closing the handles is repeated until the crush paddle is fully advanced and can move no further and is against the basket.

The primary advantage of the present invention is that it provides a device that is more compact in size and protects users from the ratcheting teeth. The ratcheting teeth of the rotating crushing face are protected and enclosed within the space between the stationary and pivoting handles.

Another advantageous aspect of the present invention is the design of the crushing area, which has two walls and a floor defined by the stationary handle and provides a rotating crushing face from compressing food materials in the crushing area against the walls, floor, and plate. This design eliminates the surface area that must be cleaned after or between uses. The result is a crushing area that has no sides resulting in easier cleaning.

Yet another advantage of the present invention is the removable plate, is simply lifted out of place for cleaning or replacement. The plate is in comprised of mounting flaps and slots that allow it to sit in a fixed position over a shaft and rest against a securing return in the crushing area.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
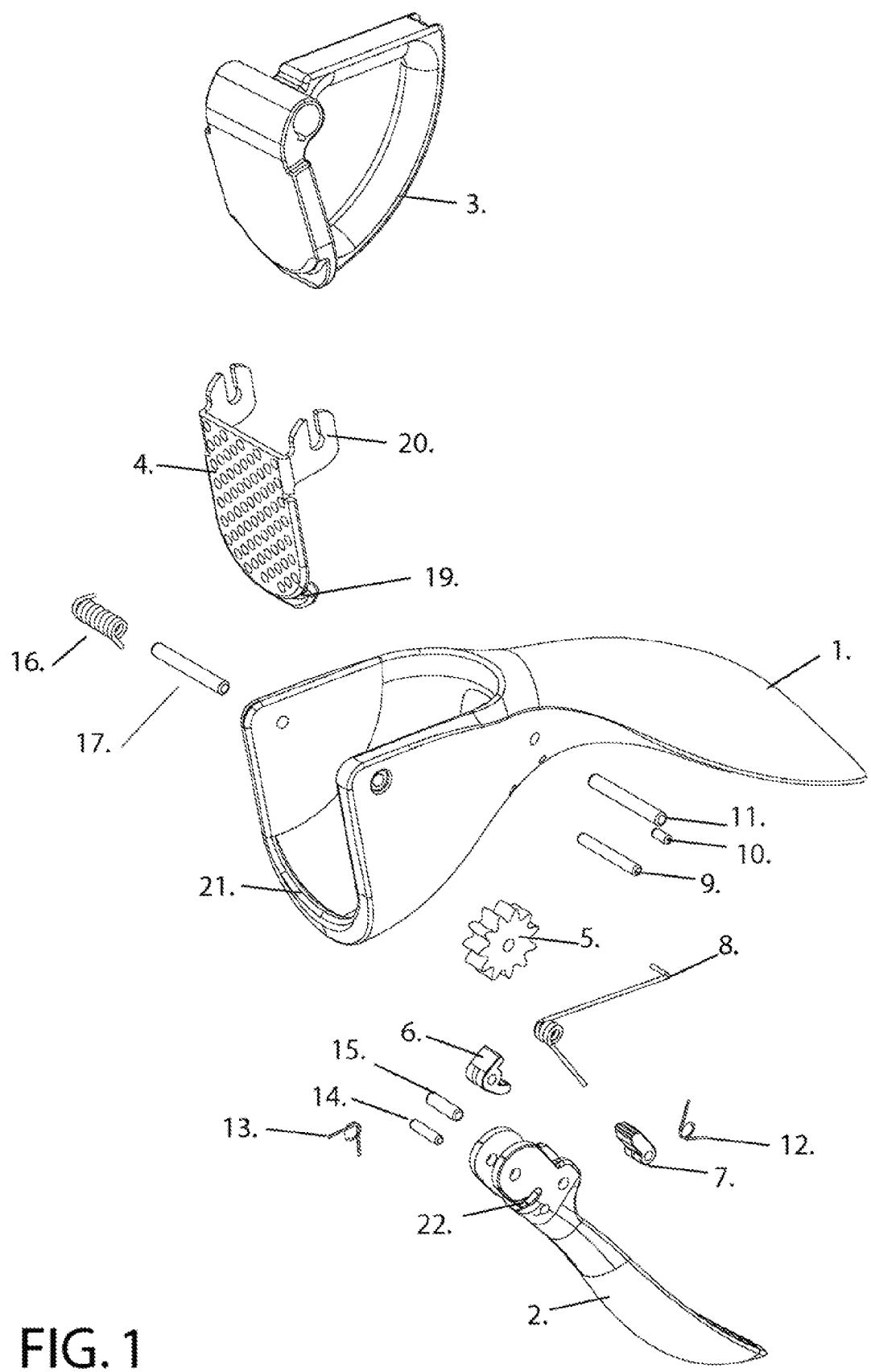
FIG. 1 is an expanded view from the front top perspective of the kitchen hand tool illustrating all physical components.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention.

Referring to the figures, it is possible to see the various major elements constituting the apparatus of the present invention. The present invention is a kitchen hand tool specifically designed for crushing, pressing and extruding food items such as garlic.

The kitchen hand tool is operated by closing the pivoting handle 2 and stationary handle 1. This action rotates a drive gear 5 which engages the ratcheting tooth portion 18 of the crush paddle 3 resulting in the movement of the crush paddle 3 toward a basket 4 and the reduction in volume in the crushing area, which results in the crushing and discharge of the food item through the basket 4.

Figure 2:
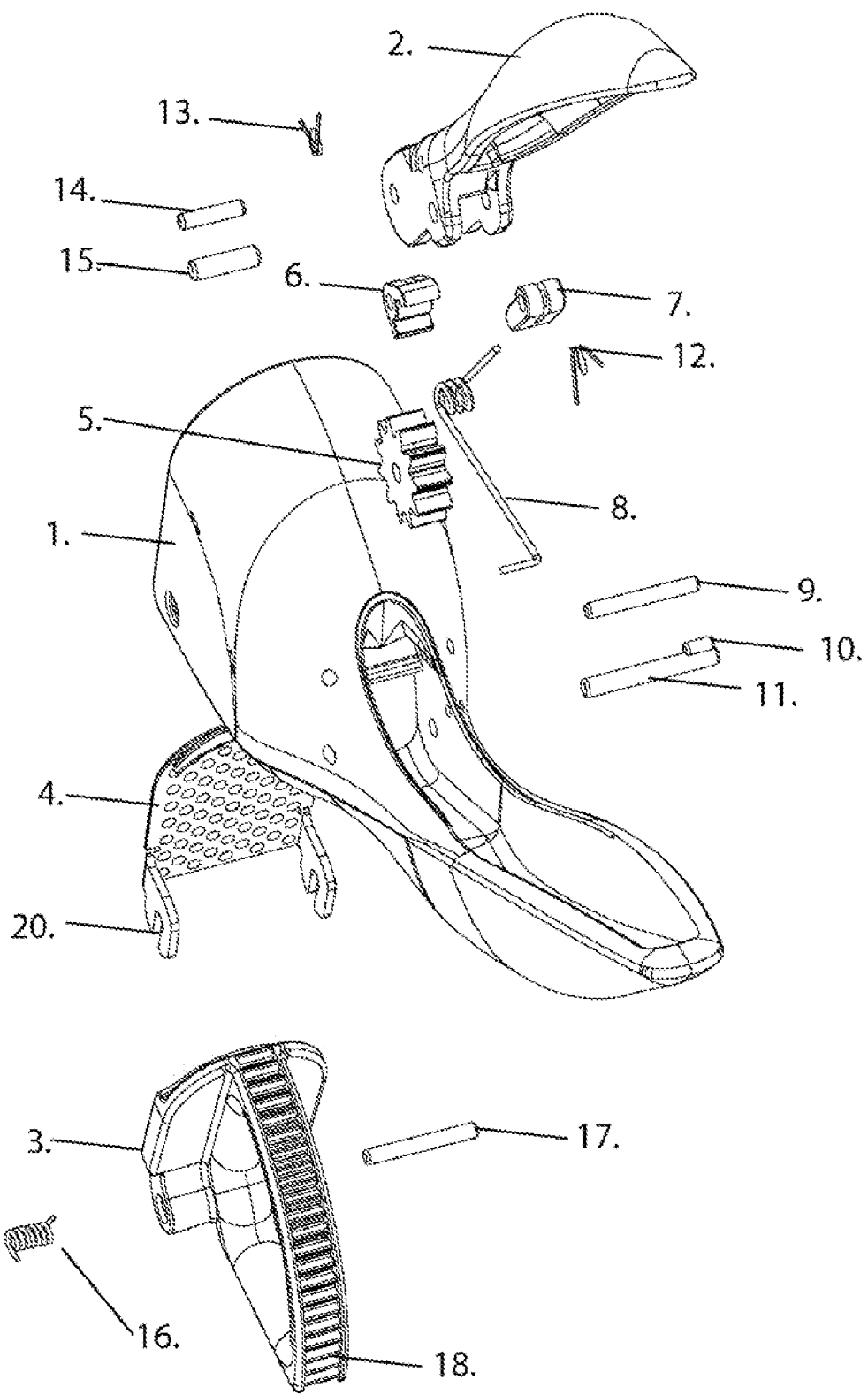
FIG. 2 is an expanded view from the rear bottom perspective of the kitchen hand tool illustrating all physical components.
Figure 4:
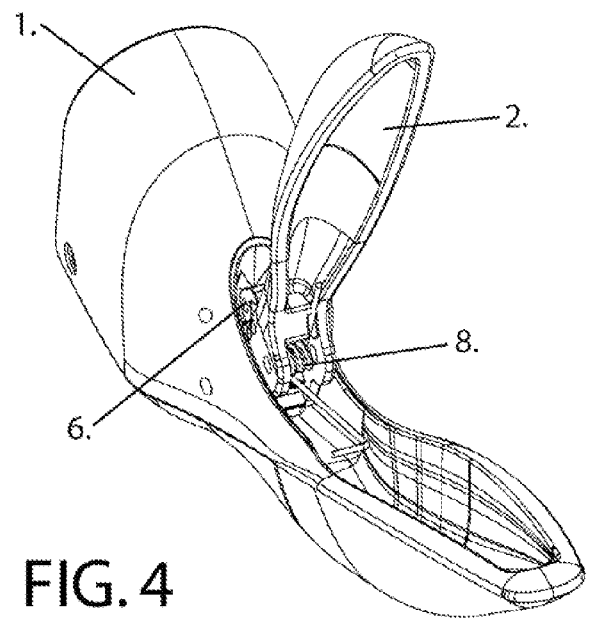
FIG. 4 is a perspective view of the kitchen hand tool.
Figure 3:
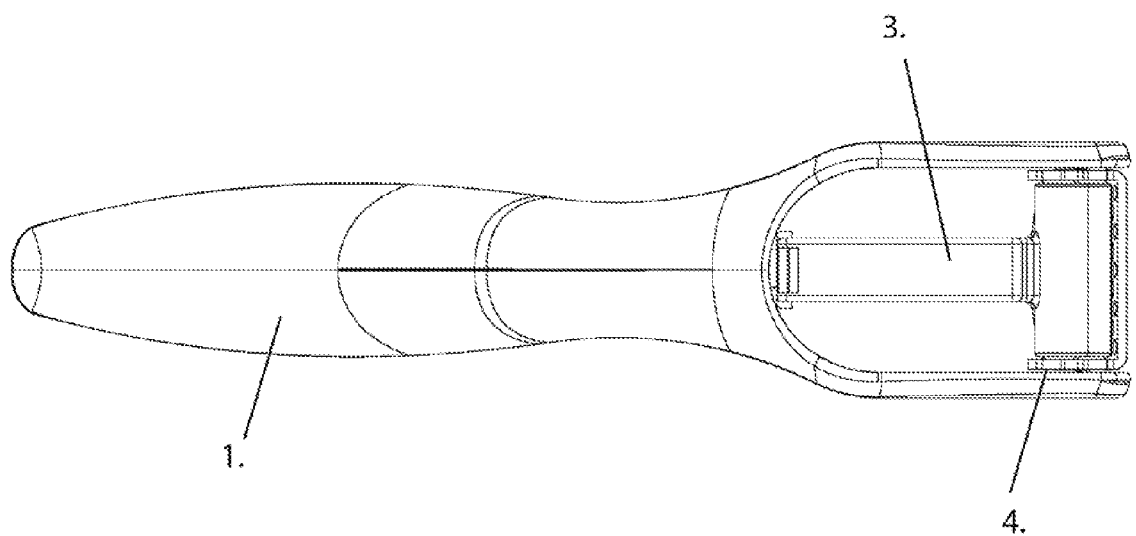
FIG. 3 illustrates the maximum opening angle between the pivoting handle and the stationary handle.

Now referring to FIGS. 1 and 2, expanded views of the components of the present invention are illustrated. The kitchen hand tool comprises in combination: a stationary handle 1 a pivoting handle 2, a replaceable basket 4, and crush paddle 3 further comprised of a ratcheting tooth portion 18 on the crush paddle 3 which engage the drive gear 5. The basket 4 and crush paddle 3 are attached to the stationary handle 1, via a crush paddle spring 16 and crush paddle pin 17.

The stationary handle 1 further comprises a locking pawl spring 13 and locking pawl pin 9 as means for securing the locking pawl 6 to the stationary handle 1. Also a handle stop pin 10 is provided that limits the extension of the pivoting handle 2 from the stationary handle 1. A slot 22 in the pivoting handle 2 catches on the stop pin 10 to prevent over rotation of the pivoting handle 2 from the stationary handle 1.

The pivoting handle 2 further comprises a drive pawl spring 12 and drive pawl pin 14 as means for securing the drive pawl 7 and drive pawl spring 12 to the pivoting handle 2; and a drive spring 8 and drive spring pin 15 as means for securing the drive spring 8 to the pivoting handle 2 resulting in a spring loaded pivoting handle 2, when attached to the stationary handle 1.

The pivoting handle 2 is secured to the stationary handle 1 by a pivoting handle pivot pin 11. The pivoting handle pivot pin 11 secures the stationary handle 1 and pivoting handle 2 together with the drive gear 5 while allowing the pivoting handle 2 to move freely with respect to its drive spring 8.

A spring loaded driving latch pawl 7 is secured to the pivoting handle 2 and engages the ratcheting tooth portion 18 of the crush paddle 3 to provide a means for controlling the movement of the pivoting handle 2 and crush paddle 3. To disengage the spring loaded driving pawl 7 from the ratcheting tooth portion 18 of the crush paddle 3, allowing the pivoting handle 2 to be returned to an open position, the pivoting handle is moved or extended into a position furthest from the stationary handle 1. When the pivoting handle 2 is extended away from the stationary handle 1 it releases the spring loaded locking pawl 6 and the spring loaded crush paddle 3 is ejected from the crushing area.

The basket 4 is secured to the stationary handle 1 by a lip 21 on the main body portion of the stationary handle 1 which engages stop basket means 19 when at a certain position 21 on three sides located on the stationary handle 1 and a crush paddle spring 16 and crush paddle pin 17. The lip 21 on the main body portion of the stationary handle 1 engages a stop basket means 19 when at a certain position 21 thereby preventing the basket 4 from being pushed out the front of the press during use.

The basket 4 has slots on the mounting flaps 20 which allow it to slide off the crush paddle pin 17 when the crushing face 4 is rotated out of the crushing area, about 180 degrees from the crushing position for easy assembly and removal for cleaning. The present invention also allows for the easy replacement of a worn or basket 4 while also enabling the tool to use different, interchangeable plates to enable crushing, slicing, or other desired pressing features. The basket 4 is no longer a permanent fixture in the pressing tool and has no bottom or side utility enabling it to be made from a stamped metal or plastic part of less complexity over those known in the prior art.

Figure 5:
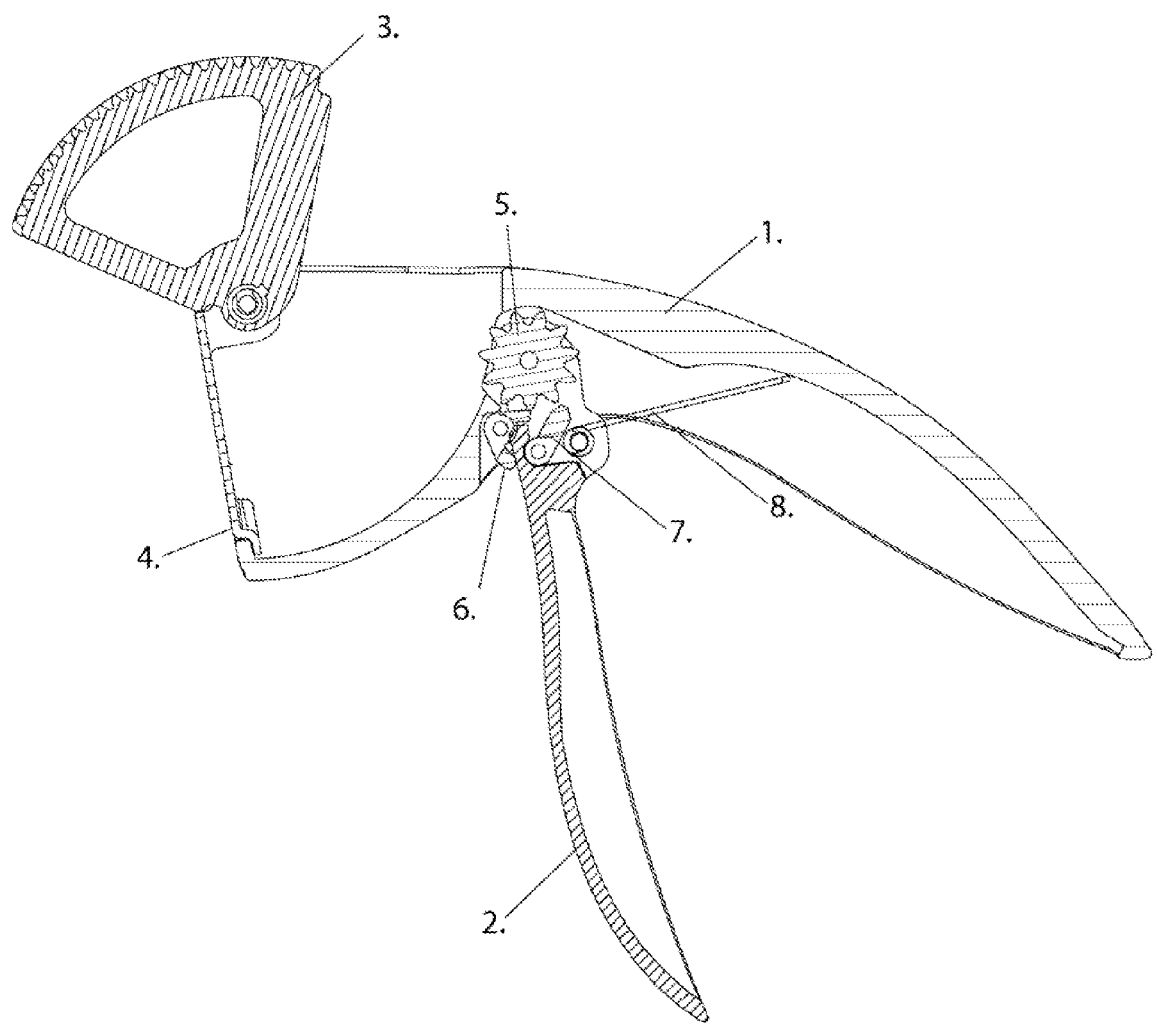
FIG. 5 is a cross sectional view that illustrates the internal ratcheting and locking mechanisms with the crushing face removed from the crushing area.
Figure 6:
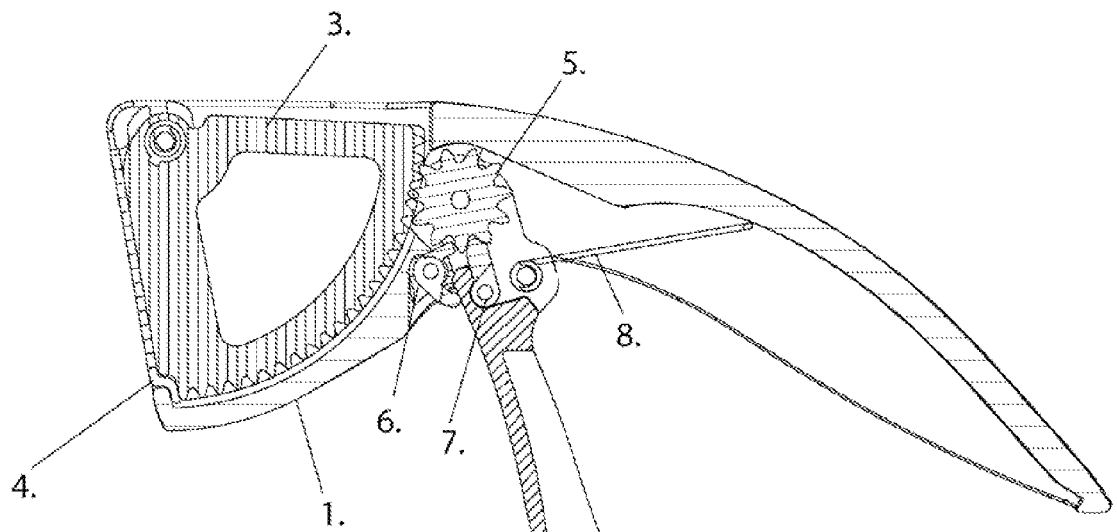
FIG. 6 is a cross sectional view which illustrates the internal ratcheting and locking mechanisms with the crushing face against the plate.
Figure 7:
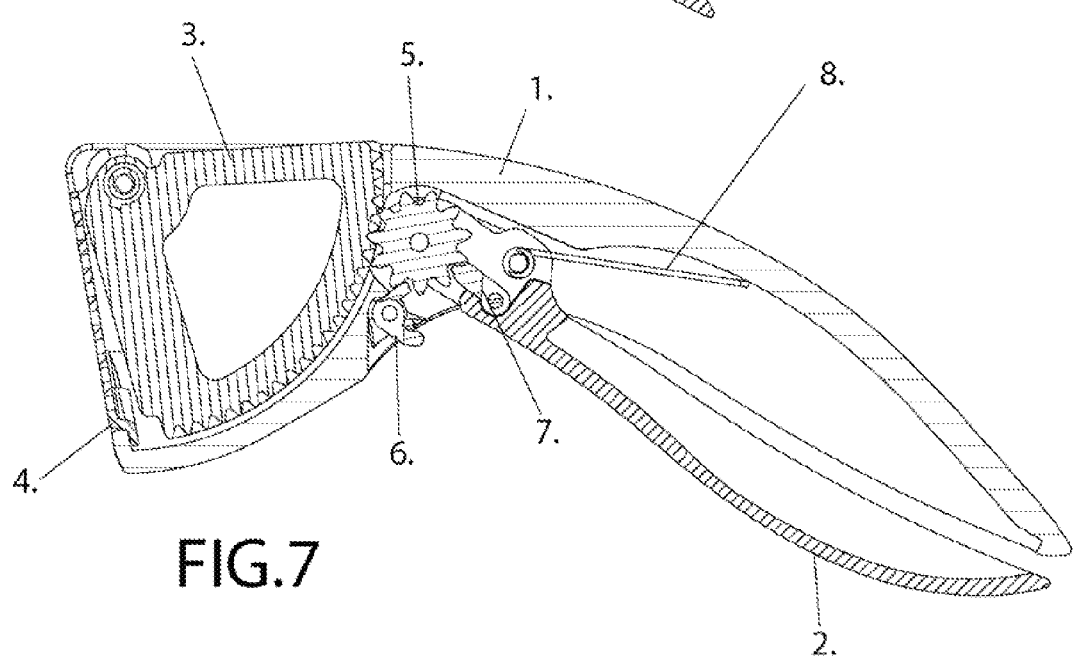
FIG. 7 is a cross sectional view which illustrates the internal ratcheting and locking mechanisms with the crushing face in the crushing area but not against the plate.
Figure 8:
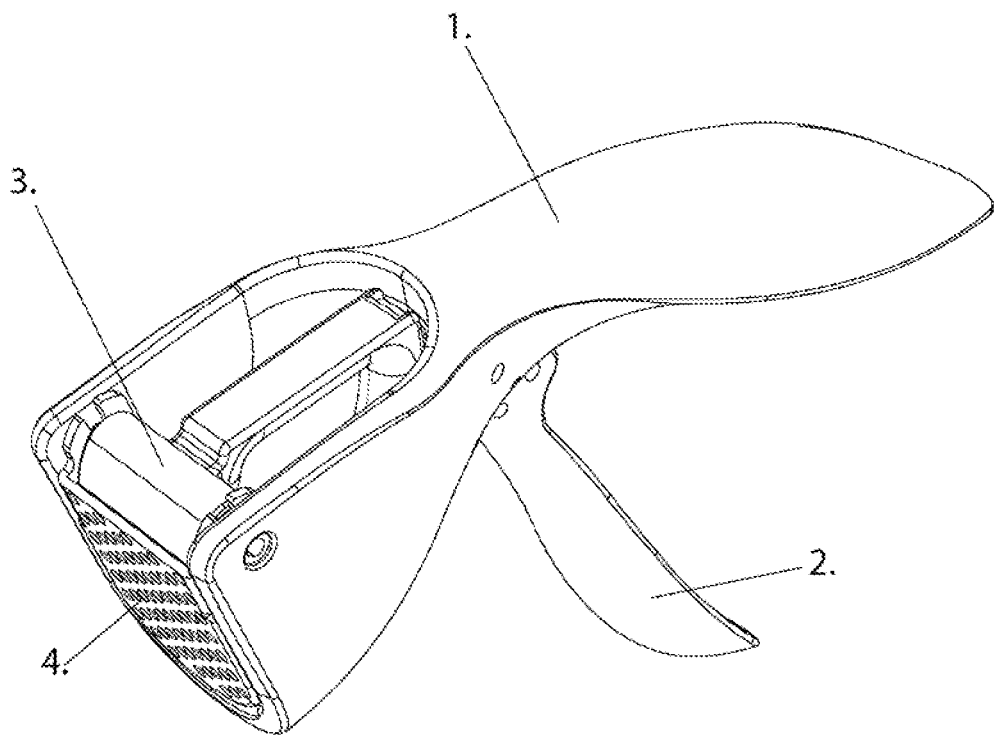
FIG. 8 is a perspective view that illustrates the internal ratcheting and locking mechanisms with the crushing face against the plate.
Figure 9:
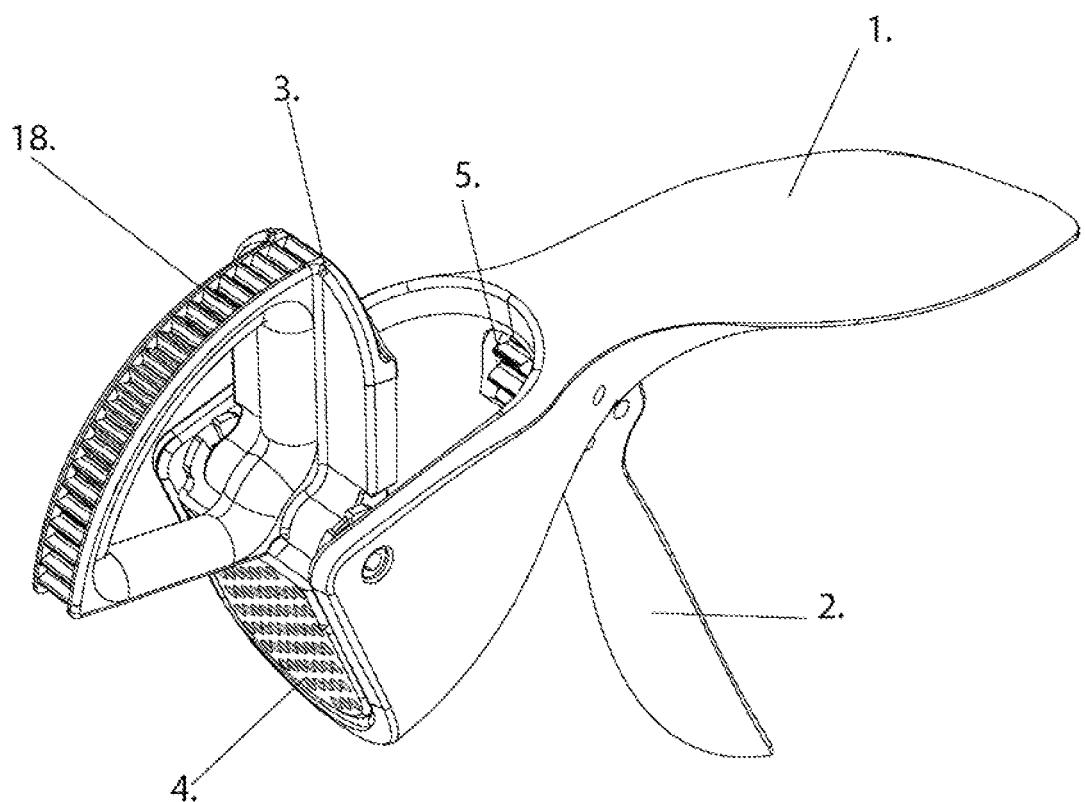
FIG. 9 is a perspective view that illustrates the internal ratcheting and locking mechanisms with the crushing face removed from the crushing area.

FIGS. 5, 6, and 7 illustrate a cross sectional view of the internal ratcheting and locking mechanisms of the kitchen hand tool of the present invention. In FIG. 6, the ratchet latch is rotated to its maximum position where the crushing face crush paddle 3 has been rotated against the basket 4. As the pivoting handle 2 is squeezed toward the stationary handle 1 the drive gear 5 incrementally moves the ratcheting tooth portion 18 and subsequently the crushing paddle 3 toward it's closed (crushed) position.

Again referring to FIG. 6, the pivoting handle 2 and stationary handle 1 are shown in a resting position. The drive spring 8 holds the pivoting handle 2 and stationary handle 1 at this position. The drive pawl 7 is engaging the drive gear 5, and the locking pawl 6 is preventing the drive gear 5 from rotating backwards. As a user moves the pivoting handle 2 and stationary handle 1 together the crushing paddle 3 moves as shown in its change from FIG. 6 to FIG. 7. The drive pawl 7 forces the drive gear 5 to rotate counterclockwise, which in turn forces ratcheting tooth portion 18 and subsequently the crushing paddle 3 down in a clockwise direction applying crushing force on the garlic or any item placed in the crushing area. As the drive gear 5 turns it clicks past the locking pawl 6, which is spring loaded so that it always returns to its locked position.

As the pivoting handle 2 and stationary handle 1 are released and the mechanism moves to return to its rest position as illustrated in FIG. 6, the drive pawl 7 rotates back and clicks over the teeth of the drive gear 5 to return to its position as shown FIG. 6. The drive pawl 7 is also spring loaded so that it always returns to its engaged position relative to the drive gear 5.

This cycle of opening and closing pivoting handle 2 and stationary handle 1 is repeated until the crush paddle 3 is fully advanced and can move no further and is against the basket 4.

At this point to release the mechanism, the user moves the pivoting handle 2 and stationary handle 1 toward their respective rest positions as shown in FIG. 5. In this position the pivoting handle 2 is opened past the rest position to hit the lower portion of the locking pawl 6. This forces the locking pawl 6 to rotate out of the path of the drive gear 5 and disengages its locking effects. Once the locking pawl 6 is moved the crush paddle spring 16 inside the axle of the crush paddle 3 forces the crush paddle 3 to rotate counter clockwise to its open position. Without the locking pawl 6 to stop it, the drive gear 5 rotates with the crush paddle 3 without impeding its motion.

Once the crush paddle 3 is rotated out fully the crushing area can be reloaded, and the crush paddle 3 rotated back counter clockwise until it engages the drive gear 5, at which point the cycle of opening and closing the pivoting handle 2 and stationary handle 1 can resume.

When the mechanism is in the open position, for example, when the crush paddle 3 is rotated fully counterclockwise, the basket 4 may be rotated out of position counterclockwise until it is approximately 180 degrees from its in use position. Once rotated the basket 4 may be pulled upward to remove it from the assembly, for cleaning, replacement, changing, etc.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The invention claimed is:

1. A kitchen hand tool comprising in combination:
   a pivoting handle;
   a stationary handle;
   a basket and a crush paddle, both of the basket and the crush paddle are pivotally attached to said stationary handle by a spring loaded shaft means;
   a spring loaded driving latch pawl secured to the pivoting handle by a spring loaded shaft means for engaging a drive gear;
   the spring loaded driving latch pawl secured to the pivoting handle for engaging said drive gear providing a means for controlling the movement of the crush paddle; said crush paddle further consisting of a ratcheting tooth portion;
   a drive spring and shaft as means for securing the stationary handle to the pivoting handle creating a spring loaded pivoting handle, when attached to the stationary handle;
   a locking pawl secured by a spring-loaded shaft as means for securing the locking pawl to said stationary handle and engaging said drive gear;
   said pivoting handle secured to said stationary handle by a securing shaft;
   said drive gear secured to said stationary handle by said securing shaft allowing said pivoting handle together with said drive gear to move freely; and
   said drive gear engages the ratcheting tooth portion of said crush paddle providing the means for controlling movement of said crush paddle.

2. The kitchen hand tool according to claim 1 wherein the basket further comprises two mounting flaps which allow the basket to slide off the spring-loaded shaft when a crushing face of the basket is rotated out of a crushing area.

3. The kitchen hand tool according to claim 2 wherein, the crushing face is rotated out of the crushing area 180 degrees from a crushing position for removal of said basket.

4. The kitchen hand tool according to claim 1 wherein
   disengagement of the spring loaded driving pawl from the drive gear, allowing the pivoting handle to be returned to an open position;
   extension of the pivoting handle into a position beyond the open position releases the locking pawl from the drive gear;
   releasing said locking pawl allows the drive gear to rotate freely thereby releasing the ratcheting tooth portion of said crush paddle and ejecting the crush paddle from a crushing area.

5. The kitchen hand tool according to claim 1 wherein the basket is further comprised of a stop basket means and said stop basket means securely engaged a lip on the stationary handle.

6. The kitchen hand tool according to claim 1 wherein as the pivoting handle is squeezed toward the stationary handle the drive gear incrementally moves the ratcheting tooth portion and the crushing paddle toward a closed position against the basket.

7. The kitchen hand tool according to claim 1 wherein
   the drive pawl engages the drive gear, and the locking pawl prevents the drive gear from rotating backwards;
   as the pivoting handle and stationary handle are moved together, the drive pawl forces the drive gear to rotate, which in turn forces the ratcheting tooth portion and subsequently the crushing paddle to move, applying a crushing force on any item placed in a crushing area; and
   as the drive gear turns it clicks past the locking pawl.

8. The kitchen hand tool according to claim 1 wherein
   as the pivoting handle and the stationary handle are released the drive pawl rotates back and clicks over the teeth of the drive gear; and
   the drive pawl always returns to the drive pawl's engaged position relative to the drive gear.

9. The kitchen hand tool according to claim 1 wherein to release the crushing paddle
   the pivoting handle is opened until it hits the locking pawl;
   the locking pawl rotates out of the path of the drive gear and disengages its locking effects; and
   once the locking pawl is moved the spring loaded shaft forces the crush paddle to rotate to an open position.

10. The kitchen hand tool according to claim 1 wherein a shaft is provided that limits the extension of the pivoting handle away from the stationary handle.

11. The kitchen hand tool according to claim 1 wherein the securing shaft also secures the drive gear within the stationary handle while allowing the pivoting handle together with said drive gear to move freely.

* * * * *